United States Patent [19]

Chen

[11] Patent Number: 5,522,607
[45] Date of Patent: Jun. 4, 1996

[54] CHUCK MECHANISM

[76] Inventor: Chao-Chung Chen, No. 486, Jen Her Road, Taichung, Taiwan

[21] Appl. No.: 402,830

[22] Filed: Mar. 13, 1995

[51] Int. Cl.⁶ .................................................. B23B 31/177
[52] U.S. Cl. ........................... 279/121; 279/123; 279/157
[58] Field of Search ................... 279/110, 121, 279/123, 157, 158; 269/229, 232–234, 285

[56] References Cited

U.S. PATENT DOCUMENTS

| | | | |
|---|---|---|---|
| 2,954,983 | 10/1960 | Roby | 279/121 |
| 3,575,434 | 4/1971 | Kiwalle et al. | 279/135 |
| 4,696,513 | 9/1987 | Nobukawa et al. | 279/121 |

*Primary Examiner*—Steven C. Bishop
*Attorney, Agent, or Firm*—Charles E. Baxley

[57] ABSTRACT

A chuck includes a body having a vertical chamber for slidably receiving a plunger and having a lateral channel for slidably receiving a pair of jaws. The plunger includes a pair of inclined slots for slidably engaging with a pair of inclined extensions extended from the plunger such that the jaws may be moved toward each other or moved away from each other when the plunger is moved along the chamber. The slots include a cylindrical and smooth inner surface and the extensions each includes a cylindrical and smooth outer surface such that the extensions and the slots may be easily manufactured.

1 Claim, 4 Drawing Sheets

CHUCK MECHANISM

BACKGROUND OF THE INVENTION

1. Field of the Invention

The present invention relates to a chuck, and more particularly to a power chuck mechanism.

2. Description of the Prior Art

Typical power chuck devices comprise a pair of jaws movable toward or away from each other for clamping an object therein such that the object may be rotated with the chuck device and may be machined by other machine devices. However, in order that the jaws may be moved toward or away from each other, typical chuck mechanisms comprise a rather complicated guiding mechanism for moving the jaws toward or away from each other. The guiding mechanism may not be easily operated and may not be easily manufactured.

The present invention has arisen to mitigate and/or obviate the afore-described disadvantages of the conventional chuck mechanisms.

SUMMARY OF THE INVENTION

The primary objective of the present invention is to provide a chuck mechanism which includes a simplified configuration that may be smoothly operated and may be easily manufactured.

In accordance with one aspect of the invention, there is provided a chuck mechanism comprising a body including a vertical chamber and including an upper portion having a lateral channel means intersected with the chamber, a plunger slidably engaged in the chamber and movable up and down along the chamber, the plunger including a longitudinal axis and including two guide slots which are inclined relative to the longitudinal axis of the plunger and which includes a cylindrical inner surface, and two jaws slidably engaged in the channel means of the body and movable toward and away from each other, the jaws including a longitudinal axis and each including an extension inclined relative to the longitudinal axis of the jaws for slidably engaging with the guide slots of the plunger, the jaws each including a cylindrical and smooth outer surface and each including a passage extended therein and extended toward the extensions for injecting grease into the guide slots and the channel means. The jaws are moved along the channel means so as to be moved toward each other or moved away from each other when the plunger is moved up and down along the chamber of the body. The slots include a cylindrical and smooth inner surface and the extensions each includes a cylindrical and smooth outer surface such that the extensions and the slots may be easily manufactured.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
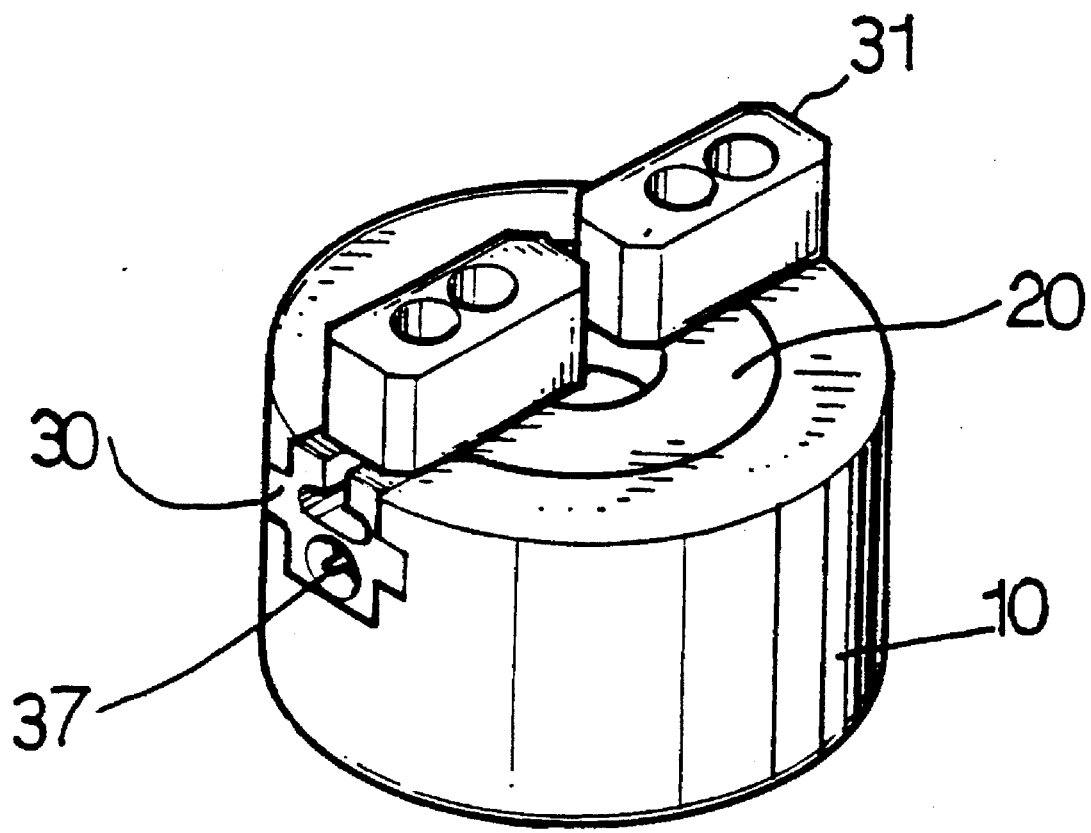
FIG. 1 is a perspective view of a chuck mechanism in accordance with the present invention.
Figure 2:
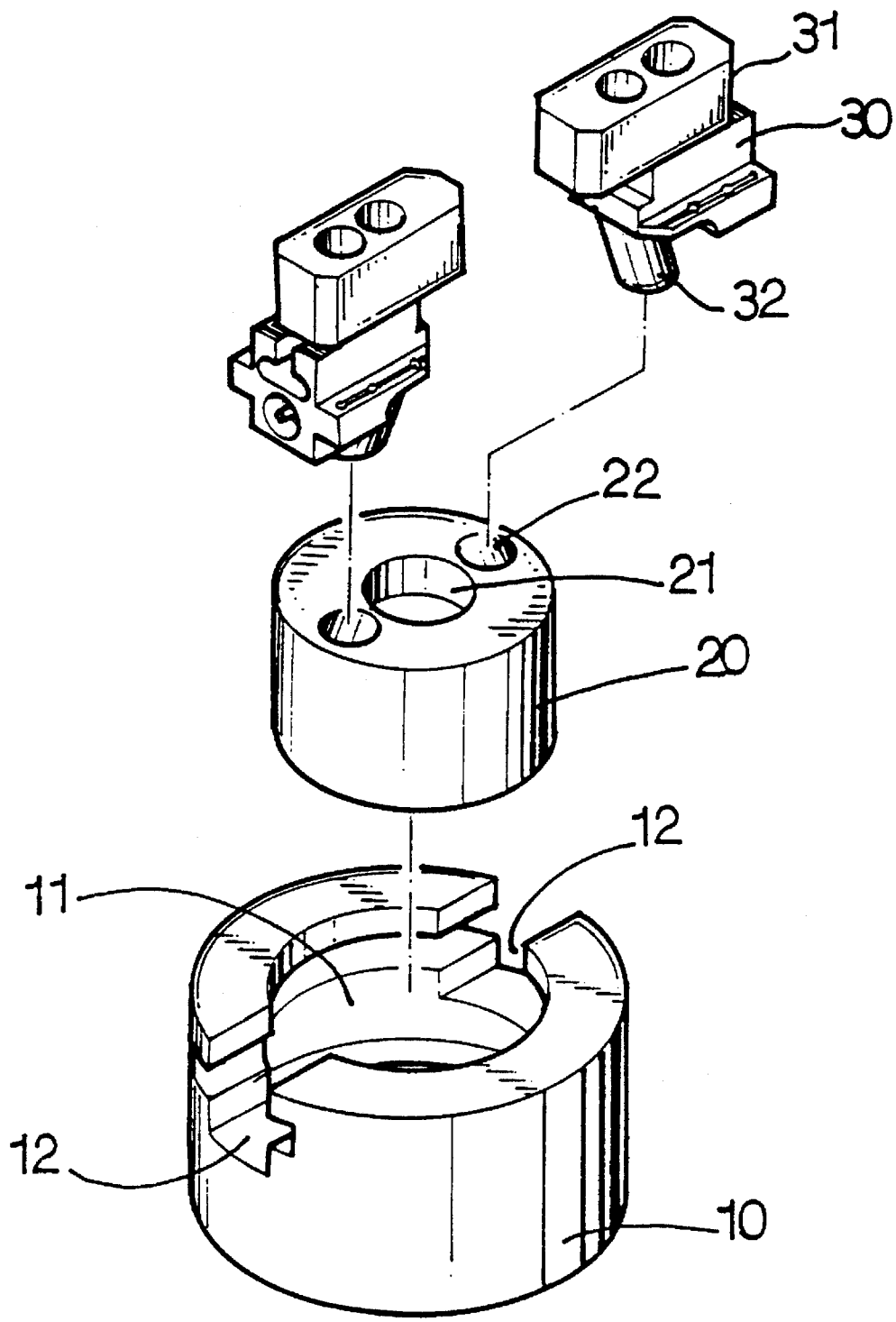
FIG. 2 is an exploded view of the chuck mechanism.
Figure 3:
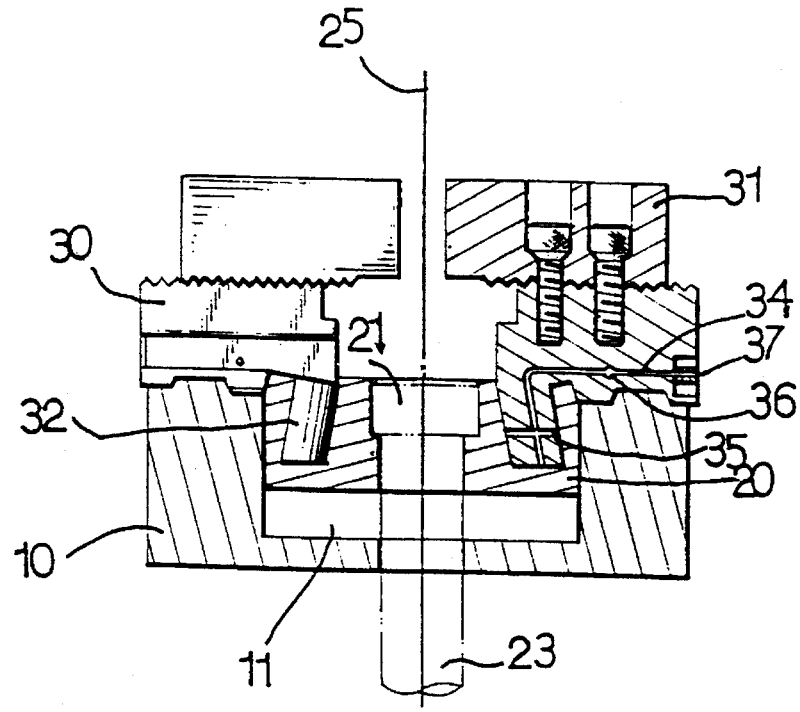

Referring to the drawings, and initially to FIGS. 1 to 3, a chuck mechanism in accordance with the present invention comprises a body 10 including a chamber 11 vertically formed therein for slidably receiving a plunger 20 and including a guide channel 12 laterally formed in the upper portion and intersected with the chamber 11. The plunger 20 includes a bore 21 for engaging with a draw bar 23 which may be provided for drawing the plunger 20 to move longitudinally along the chamber 11 of the body 10. The plunger 20 further includes a pair of guide slots 22 oppositely formed in the plunger 20 and inclined relative to the longitudinal axis 25 of the plunger 20. A pair of jaws 30 each includes a top jaw member 31 secured on top thereof and each includes an extension 32 inclined relative to the longitudinal axis 33 of the jaws 30. The extensions 32 are slidably engaged in the guide slots 22 such that the jaws 30 may move toward or away from each other when the extensions 32 move inwards or outwards of the guide slots 22. The jaws 30 are slidably engaged in the guide channel 12 of the body 10 such that the jaws 30 are guided to move laterally along the guide channel 12 and such that the jaws 30 may either move toward or move away from each other.

Figure 4:
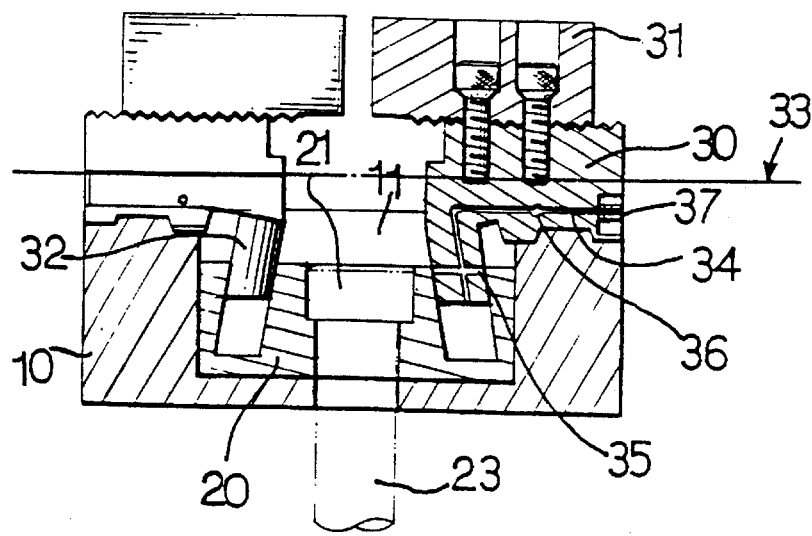
FIGS. 3 and 4 are cross sectional views illustrating the operation of the chuck mechanism.

In operation, as shown in FIGS. 3 and 4, when the plunger 20 is moved up and down along the chamber 11 of the body 10 by the draw bar 23; for example, when the plunger 20 is moved downward from the position as shown in FIG. 3 to the position as shown in FIG. 4, the extensions 32 and thus the jaws 30 are forced to move toward each other in order to clamp the object in place for further machining operations. When the plunger 20 is moved upward along the chamber 11 by the draw bar 23, the jaws 30 may be separated from each other so as to release the object.

It is to be noted that the extensions 32 include a cylindrical and smooth outer surface, and the guide slots 22 also include a cylindrical and smooth inner surface such that both the guide slots 22 and the extensions 32 may be easily machined and may smoothly engage with each other. In order to facilitate the sliding movement of the extensions 32 in the guide slots 22, the jaws 30 further include a passage 34 longitudinally formed in the jaws 30 and extended toward the extensions 32 and include an aperture 34 and an orifice 35 formed in the jaw body 30 and formed in the extensions 32 respectively and intersected with the passage 34. The jaws 30 each further includes a mouth 37 communicating with the passage 34 for injecting grease oil into the passage 34, the aperture 34 and the orifice 35 in order to lubricate the engaging surfaces between the extensions 32 and the guide slots 22 and between the jaws 30 and the guide channel 12.

Figure 5:
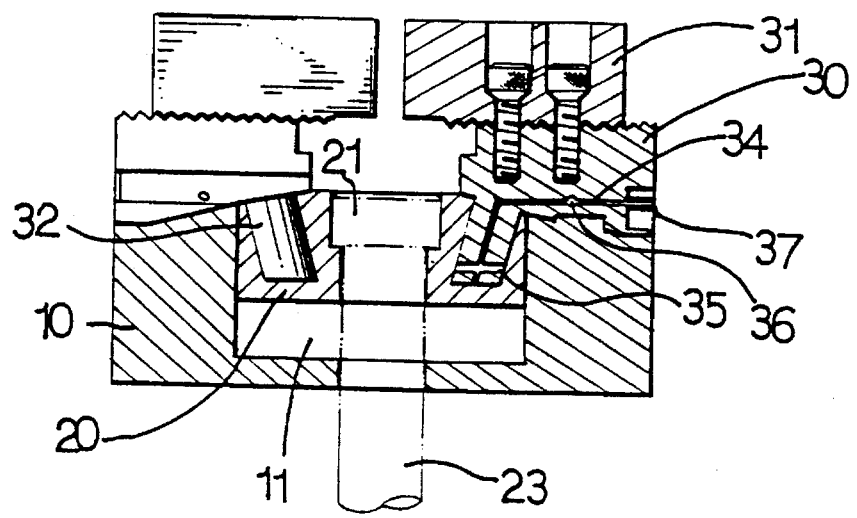
FIGS. 5 and 6 are cross sectional views illustrating the operation of the other embodiment of the chuck mechanism.
Figure 6:
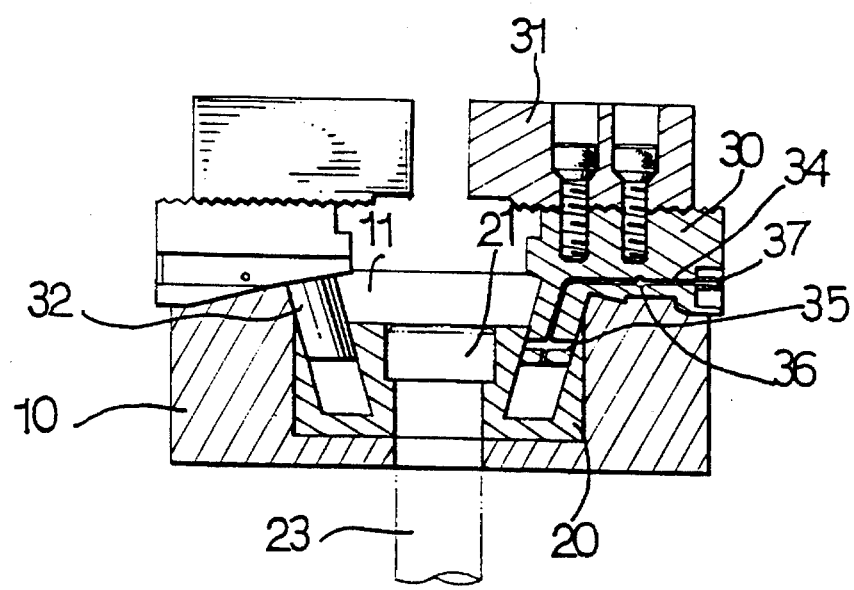

Referring next to FIGS. 5 and 6, the extensions 32 may be inclined and extended in a direction opposite to that shown in FIGS. 2 to 4, such that the jaws 30 may be separated from each other when the plunger 20 is pulled downward by the draw bar 23 and may be moved toward each other when the plunger 20 is moved upward.

Accordingly, the chuck mechanism in accordance with the present invention includes a simplified configuration that may be smoothly operated and may be easily manufactured.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A chuck mechanism comprising:

a body including a chamber vertically formed therein and including an upper portion having a channel means laterally formed and intersected with said chamber, a plunger slidably engaged in said chamber and movable up and down along said chamber, said plunger including a longitudinal axis and including at least two guide slots formed therein, said guide slots being inclined relative to said longitudinal axis of said plunger and including a cylindrical inner surface, and at least two jaws slidably engaged in said channel means of said body and movable toward and away from each other, said jaws including a longitudinal axis and each including an extension inclined relative to said longitudinal axis of said jaws for slidably engaging with said guide slots of said plunger, said extensions each including a cylindrical and smooth outer surface and each including a passage extended therein and extended toward said extensions for injecting grease into said guide slots and said channel means, said jaws being moved along said channel means so as to be moved toward each other or moved away from each other when said plunger is moved up and down along said chamber of said body.

* * * * *